Jan. 19, 1960 H. G. EVERS 2,921,983

PARTY LINE PAYSTATION IDENTIFICATION

Filed Oct. 11, 1955

Inventor:
Harry G. Evers.
By [signature] Atty.

2,921,983

PARTY LINE PAYSTATION IDENTIFICATION

Harry G. Evers, Genoa, Ill., assignor to Leich Electric Company, Genoa, Ill., a corporation of Illinois Application October 11, 1955, Serial No. 539,769

6 Claims. (Cl. 179—17)

This invention relates to telephone party lines and is particularly concerned with a circuit arrangement for identifying pay-stations connected to party lines.

One object of the invention is to provide a circuit arrangement which makes it possible to mix regular party line subscribers' stations, for example, flat rate stations and paystations on the same party line, that is, to provide both classes of services on one and the same party line.

This object is realized by the provision of a tone signal generator forming part of a paystation connected to a party line, for generating responsive to a call initiated at such paystation a characteristic tone signal which is transmitted to the switchboard of the associated exchange so as to identify the call as having originated at the corresponding paystation. The identification of the calling line as a paystation is necessary so as to enable the exchange operator to supervise the deposit of coins to pay for the charges of paystation calls.

In accordance with a feature of the invention, the tone signal generator comprises circuit means including a relay which is upon removal of the handset at the paystation connected across the line to the exchange, means for initially preventing the operation of said relay until the operator answers the call, and circuit control means for thereupon periodically or intermittently actuating and releasing the relay to cause it to operate as a buzzer, thereby generating the characteristic tone signal which is transmitted to the exchange switchboard to identify the calling station as a paystation.

According to another feature of the invention, the circuit control means comprises means for determining the length or duration of the identification tone signal transmitted to the exchange switchboard.

According to a further feature of the invention, the circuit control means for the relay may be a capacitor-resistor arrangement, with the resistor adjustable so as to control the length of the identification tone signal.

In accordance with another feature of the invention, the circuit control means for the relay may be a thermistor, the increments of rise of temperature of the thermistor and consequent lowering of the resistance thereof determining the duration or length of the identification tone signal.

According to still another feature of the invention, the circuit means comprising the above-indicated relay remains connected across the line for the duration of the call from the corresponding paystation, with the circuit control means therefor inactive, the impedance of the relay being of a magnitude such as to prevent undue attenuation of the voice currents.

Figure 1:
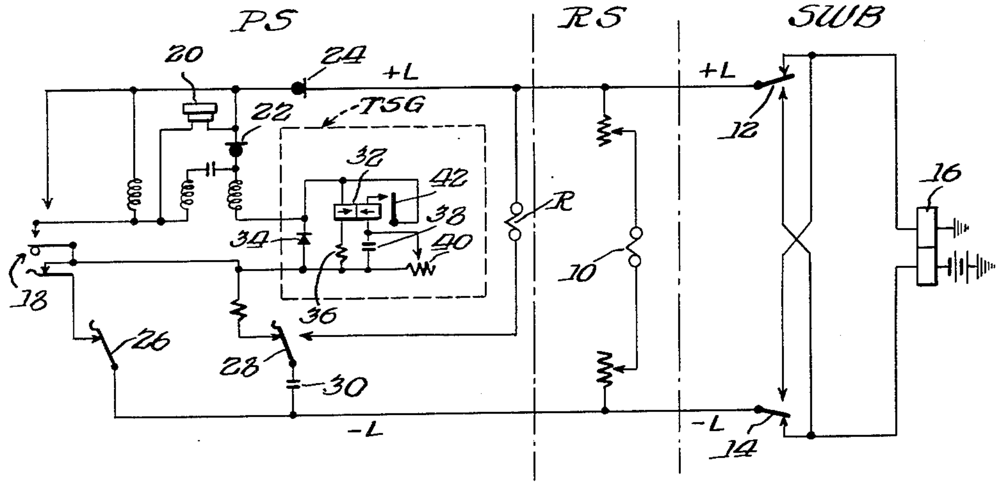
Figure 2:
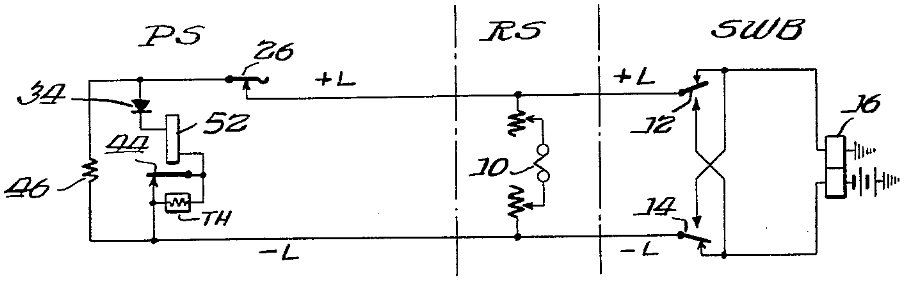

The foregoing and further objects and features will appear from the description of embodiments of the invention which is rendered below with reference to the accompanying diagrammatic drawing in which Fig. 1 shows in schematic circuit representation one embodiment of the invention employing a capacitor-resistor combination as a control means for the tone generating relay; and Fig. 2 shows in similar representation another embodiment employing a thermistor as a control means for the tone generating relay.

Known details have been partly omitted or shown greatly simplified so as to keep the drawing simple. Identical parts are indicated by identical references throughout the drawing.

Referring now to Fig. 1, reference characters PS indicate a party line paystation; characters RS indicate a regular party line station, showing of such regular station only the ringer 10 which is, for example, connected across the line conductors when the receiver is on the hook; and characters SWB indicate exchange switchboard elements including the line reversal contacts 12 and 14 and battery feed relay 16.

The line reversal contacts 12 and 14 are operated in known manner by a known relay (not shown) when the operator at the switchboard SWB answers a call. The battery feed relay 16 operates in known manner and for well-known purposes. Other switchboard elements have no direct bearing on the invention and have been omitted as they are likewise known and well understood.

The regular party line station RS comprises in addition to the ringer 10 (which may be normally connected across the line conductors as shown) usual elements which are as to structure and operation known and well understood and which have been omitted as they have no direct bearing on the invention.

The paystation PS is connected to the same party line as the regular party line station RS, the line conductors +L and —L terminating in the switchboard SWB in the reversal contacts 12 and 14. It is understood, of course, that several regular party line stations may in accordance with known practice be connected to the party line and more than one paystation may likewise be provided if desired.

The paystation PS comprises in the illustrated example principal well-known elements including a dial 18; a receiver 20; a transmitter 22; hookswitch contacts 26 and 28; a coin control 24; a ringer R; and the usual induction coil, all as shown in the drawing. The hookswitch contacts 26 and 28 are shown in operated position, that is, in position in which they are placed when the hookswitch is removed to extend a call. The ringer R may be connected to the +L party line conductor. Accordingly, the paystation PS may be called from the switchboard SWB by transmitting ringing current over the party line conductors +L and —L to operate the ringer R in a circuit involving the capacitor 30 and the hookswitch contact 28 when such contact is in normal closed position.

In addition to the above-described elements, the paystation PS is in accordance with the invention provided with a tone signal generator generally indicated by characters TSG. This generator comprises a differential relay 32 having two opposing windings and circuit control means therefor comprising a rectifier 34, a resistor 36, and a capacitor 38 normally shunted by an adjustable resistor 40. The rectifier 34 is connected in parallel with one winding of the relay 32 (the left-hand winding as shown in the drawing) which is connected in series with the resistor 36. One terminal of the other winding of relay 32 (right-hand winding as shown in the drawing) is connected with contact 42 which is controlled thereby, and the other terminal of such winding is connected with the capacitor-resistor circuit 38 and 40.

The operation is as follows:

When a call is made from the paystation PS, the hookswitch contacts 26 and 28 are placed into the positions in which they are shown in the drawing. Current now flows from the battery at the switchboard SWB, in a circuit including the lower winding of relay 16, contact 14, party line conductor —L, hookswitch contact 26, normally closed contact of the dial 18, rectifier 34 in parallel with the resistor 36 and left-hand winding of relay 32, transmitter 22, coin control 24, party line conductor +L, contact 12, upper winding of relay 16 to ground. The shunt formed by the rectifier 34 around the left-hand winding of relay 32 prevents actuation of such relay and the relay accordingly remains initially normal. The switchboard operator now receives in known manner a signal informing her that a call has been initiated on the party line.

The operator, upon answering the call, causes in known and well understood manner reversal of the battery feed by actuation of contacts 12 and 14. Current now flows in the above traced circuit in reverse direction, thus making the rectifier 34 ineffective and accordingly allowing relay 32 to operate by energization of its left-hand winding, thereby closing its contact 42 and consequently connecting its right-hand winding to the capacitor-resistor circuit 38/40. Current now flows in both windings of relay 32 and the current flowing through the right-hand winding charges the capacitor 38. Since the windings oppose each other, relay 32 will immediately restore and open its contact 42, thereby opening the charging circuit through its right-hand winding, and as a consequence, relay 32 reoperates due to current flow through its left-hand winding.

The intermittent release and reoperation of relay 32 causes such relay to operate as a buzzer and the resulting current fluctuations in the line produce the characteristic tone signal for the switchboard operator, indicating that the call originated at the paystation.

The completion as well as release of the call and coin collection are effected in known manner.

Upon each release of relay 32, a portion of the charge on the capacitor 38 is dissipated through the variable resistor 40, until the charge is reduced to a point where the charging current is insufficient to effect release of the relay. The tone signal now ceases and relay 32 remains operated over its left-hand winding, the resistance of resistor 40 being too high for energizing the right-hand winding sufficiently to cause restoration of the relay. The relay remains operated for the duration of the call.

It will be seen from the foregoing explanations that the length or duration of the identification tone signal is controlled by varying the operatively effective magnitude of the resistance of the charge control resistor 40.

Voice currents pass through the windings of relay 32 with relatively small loss because of the differential connection of its windings.

Fig. 2 shows another embodiment of the invention employing a temperature responsive resistor element, for example, a thermistor as a control means for effecting the intermittent actuation of the control relay to generate the identification tone signal. Only the principal elements are schematically shown in connection with the paystation PS, namely, the elements forming the tone generator and a hookswitch contact. The showing of the regular party line subscriber station RS and of the elements of the switchboard SWB corresponds to Fig. 1.

The tone generator at the paystation PS (Fig. 2) comprises a rectifier 34 (corresponding to the similarly referenced rectifier shown in Fig. 1); a relay 52 (corresponding to relay 32 of Fig. 1); a control circuit including normally closed contact 44 controlled by relay 52 and a thermistor TH (corresponding to the control circuit comprising the elements 38/40 of Fig. 1). A relatively low resistance resistor 46 is schematically shown as being connected in parallel with the tone generator elements. Numeral 26 indicates a hookswitch contact (corresponding to like numbered hookswitch contact of Fig. 1), shown in actuated position, that is, in the position in which it is placed responsive to removal of the handset to extend a call. All other elements of the paystation PS may correspond generally to those described in connection with Fig. 1.

The circuit arrangement of Fig. 2 operates as follows:

Upon closure of the hookswitch contact 26, responsive to removal of the handset to initiate a call, the relatively low resistance bridge resistor 46 is placed across the party line conductors +L and —L to transmit a call signal to the switchboard SWB. Current flows from the exchange battery, lower winding of relay 16, contact 14, conductor —L, through the resistor 46 and back to ground over the conductor +L, contact 12 and upper winding of relay 16. Current flows through the elements of the tone generator, including the relay 52 is blocked by the rectifier 34, thus preventing operative actuation of relay 52.

When the call is answered, contacts 12 and 14 reverse the battery connections to the party line, thus causing current to flow in opposite direction. The rectifier 34 now passes current through the relay 52 and such relay operates and actuates its contact 44 to remove the shunt from the thermistor TH. The high cold resistance of the thermistor TH is accordingly placed in series with relay 52, causing such relay to restore. The thermistor TH is thereby again short circuited and relay 52 consequently actuates again, reconnecting the thermistor in series with its own winding and consequently restoring again as before. The cycle is repeated, causing relay 52 to operate as a buzzer and to generate thereby current fluctuations in the line to produce the identification tone signal exactly as in the embodiment described in connection with Fig. 1.

The intermittent operation of relay 52 energizes the thermistor TH similarly intermittently. The temperature of the thermistor rises with each energization and its resistance is thus gradually lowered until it reaches after approximately 1 to 2 seconds a value sufficiently low to permit relay 52 to remain operated in series with the thermistor resistor. The transmission of the tone signal ceases.

The operations relating to the completion of the call and the coin collection as well as release of the call are well known and description thereof is therefore omitted.

Relay 52 remains connected in the voice current circuit for the duration of the call. Its impedance prevents undue attenuation of the voice frequencies.

The battery connection is upon conclusion of the call returned to normal by restoration of the contacts 12 and 14 to the positions shown. The rectifier 34 accordingly will again block current flow through relay 52 and the thermistor TH. Relay 52 restores, placing its contact 44 into the illustrated position. The thermistor TH cools in preparation for another call.

The paystation identification tone signal is in each embodiment transmitted for about 1–2 seconds. The frequency of the tone signal is determined by the characteristics of the elements for governing the intermittent operation of the control relay; such characteristics may within certain limits be provided so as to produce a tone signal frequency on the order of about 300 to 400 cycles per second. The duration of the tone signal is in Fig. 1 determined by the setting of the adjustable resistor 40 and in Fig. 2 by the magnitude of the resistance of the thermistor TH and its temperature-resistance response characteristic.

Representative values of the elements herein described are as follows: adjustable resistor 40—400 ohms; capacitor 38—750 micro-farads; resistor 36—100 ohms; relay 32 (each winding)—75 ohms; thermistor TH—1050 ohms @ 25° C.; relay 42—80 ohms; resistor 46—125 ohms. Obviously, other combinations of values may be used to accomplish the functions of this invention and it is intended that the values above-mentioned are only for the purpose of illustrating one practical set of values.

It is understood, of course, that the arrangement according to the invention may be provided for semi-automatic or fully automatic or for manual operation. The term "switchboard," unless otherwise limited is intended to mean exchange equipment whether attended by an operator or not. It is further understood that the party line may terminate in an exchange comprising selection means including selectors and connectors; in other words, the invention is not inherently limited for use either in small or large capacity systems.

Changes may be made within the scope and spirit of the appended claims.

I claim:

1. In a telephone system, an exchange, a party line having line conductors terminating in said exchange, a paystation connected to said party line, and a circuit arrangement for transmitting to said exchange a characteristic tone signal to identify said paystation when a call is initiated at said paystation, said circuit arrangement including a relay and control means, said control means comprising a resistive-capacitive combination for governing the actuation of said relay to cause transmission to said exchange of said characteristic tone signal for the duration of a predetermined time interval, said resistive-capacitive combination including a variable resistor, the adjustment of said variable resistor determining the duration of said time interval.

2. In a telephone system, an exchange, a party line having line conductors terminating in said exchange, a paystation connected to said party line, and a circuit arrangement for transmitting to said exchange a characteristic tone signal to identify said paystation when a call is initiated at said paystation, said circuit arrangement including a relay and control means, said control means including means connected with said relay and having a resistance-capacitance network including a variable resistor for governing the actuation of said relay to cause transmission to said exchange of said characteristic tone signal for the duration of a predetermined time interval.

3. In a telephone system, an exchange, a party line having line conductors terminating in said exchange, a paystation connected to said party line, and a circuit arrangement for transmitting to said exchange a characteristic tone signal to identify said paystation when a call is initiated at said paystation, such circuit arrangement including a relay and control means, said relay having two opposing windings, said control means including a rectifier connected in parallel with one of said windings and a capacitor connected in series with the other one of said windings.

4. In a telephone system, an exchange, a party line having line conductors terminating in said exchange, a paystation connected to said party line, and a circuit arrangement for transmitting to said exchange a characteristic tone signal to identify said paystation when a call is initiated at said paystation, said circuit arrangement including a relay and control means, said relay having two opposing windings, said control means including a rectifier connected in parallel with one of said windings and a capacitor connected in parallel with a variable resistor and means controlled by said relay for connecting said capacitor-resistor with the other one of said windings.

5. In a telephone system, an exchange, a party line having line conductors terminating in said exchange, a paystation connected to said party line, a circuit arrangement for transmitting to said exchange a characteristic tone signal to identify said paystation when a call is initiated at said paystation, said circuit arrangement including a relay and means for connecting said relay in the circuit extending over said line conductors to the exchange, a rectifier for blocking the operative actuation of said relay responsive to current flow over said line conductors in a predetermined initial direction, a resistance-variable resistor element, and means controlled by said relay upon operative actuation thereof responsive to current flow over said line conductors in reverse direction for applying a potential to said resistance-variable resistor element in the circuit extending over said line conductors.

6. In a telephone system, an exchange, a party line including line conductors terminating in said exchange, a paystation connected to said party line, and a circuit arrangement for transmitting to said exchange a characteristic tone signal to identify said paystation when a call is initiated therefrom, said circuit arrangement including an intermittently actuated relay for generating said signal, said circuit arrangement including control means for governing the actuation of said relay for the duration of a predetermined time interval, said control means including a resistance-variable resistor in series with said relay and means for shunting said resistor periodically during said time interval to periodically operate said relay, said resistor thereafter allowing said relay to remain operated shutting off said tone signal.

References Cited in the file of this patent

UNITED STATES PATENTS

| | | |
|---|---|---|
| 1,756,097 | Niles et al. | Apr. 30, 1930 |
| 2,113,217 | Nelson | Apr. 5, 1938 |
| 2,148,560 | Johnson et al. | Feb. 28, 1939 |
| 2,672,513 | Lomax | Mar. 16, 1954 |
| 2,717,279 | Matlack | Sept. 6, 1955 |
| 2,729,703 | Faulkner | Jan. 3, 1956 |
| 2,733,297 | Matlack | Jan. 31, 1956 |
| 2,753,403 | Caracciolo | July 3, 1956 |
| 2,782,259 | Dimond | Feb. 19, 1957 |
| 2,794,859 | Abbott et al. | June 4, 1957 |
| 2,801,290 | Muller | July 30, 1957 |
| 2,802,059 | Spack | Aug. 6, 1957 |